(12) United States Patent
De

(10) Patent No.: US 9,528,718 B2
(45) Date of Patent: Dec. 27, 2016

(54) HVAC MOTOR LOAD BALANCING

(75) Inventor: Tathagata De, Charlotte, NC (US)

(73) Assignee: CARRIER CORPORATION, Farmington, CT (US)

( * ) Notice: Subject to any disclaimer, the term of this patent is extended or adjusted under 35 U.S.C. 154(b) by 357 days.

(21) Appl. No.: 14/237,946

(22) PCT Filed: Aug. 6, 2012

(86) PCT No.: PCT/US2012/049714
§ 371 (c)(1),
(2), (4) Date: Feb. 10, 2014

(87) PCT Pub. No.: WO2013/022822
PCT Pub. Date: Feb. 14, 2013

(65) Prior Publication Data
US 2014/0188289 A1    Jul. 3, 2014

Related U.S. Application Data

(60) Provisional application No. 61/521,955, filed on Aug. 10, 2011.

(51) Int. Cl.
*F24F 11/00* (2006.01)
*H02P 27/04* (2016.01)
*H02P 29/02* (2016.01)
*H02M 1/00* (2006.01)

(52) U.S. Cl.
CPC .......... *F24F 11/0086* (2013.01); *H02P 27/04* (2013.01); *H02P 29/025* (2013.01); *H02P 29/026* (2013.01); *F24F 2011/0052* (2013.01); *H02M 2001/0096* (2013.01)

(58) Field of Classification Search
CPC ................................................... F24F 11/0086
USPC ............................................. 318/4, 34, 558
See application file for complete search history.

(56) References Cited

U.S. PATENT DOCUMENTS

| 4,267,704 | A | | 5/1981 | Yapp |
| 5,195,329 | A | | 3/1993 | Lewis et al. |
| 5,959,431 | A | * | 9/1999 | Xiang ................. H02P 23/0004 318/811 |
| 7,439,702 | B2 | | 10/2008 | Smith et al. |
| 7,631,515 | B2 | | 12/2009 | Jacobi |
| 7,793,509 | B2 | | 9/2010 | Crane |
| 7,957,166 | B2 | * | 6/2011 | Schnetzka ............. H02M 7/003 363/40 |

(Continued)

FOREIGN PATENT DOCUMENTS

CN    101404474 A    4/2009

OTHER PUBLICATIONS

PCT International Preliminary Report on Patentability and Written Opinion of the International Searching Authority for International Application No. PCT/US2012/049714, Feb. 20, 2014, 5 pages.

(Continued)

*Primary Examiner* — David S Luo
(74) *Attorney, Agent, or Firm* — Cantor Colburn LLP

(57) ABSTRACT

A method of motor operation includes monitoring a voltage of a power bus supplying power to the motor, determining if a power failure is occurring or has occurred based on the monitoring, and lowering an operational capacity of the motor in response to the determining.

17 Claims, 2 Drawing Sheets

(56) References Cited

U.S. PATENT DOCUMENTS

| | | | |
|---|---|---|---|
| 8,339,093 B2 * | 12/2012 | Lu ........................... | H02P 23/00 318/432 |
| 2003/0098668 A1 | 5/2003 | Jadric et al. | |
| 2007/0063668 A1 | 3/2007 | Schnetzka et al. | |
| 2008/0115527 A1 | 5/2008 | Doty et al. | |
| 2009/0038324 A1 | 2/2009 | Khalifa | |
| 2010/0083692 A1 | 4/2010 | Todd et al. | |
| 2010/0088261 A1 | 4/2010 | Montalvo | |
| 2010/0101254 A1 | 4/2010 | Besore et al. | |
| 2012/0095614 A1 | 4/2012 | DeLayo | |

OTHER PUBLICATIONS

Chinese First Office Action and Search for application CN 201280039096.1, dated Jan. 22, 2016, 4 pages.

* cited by examiner

HVAC MOTOR LOAD BALANCING

BACKGROUND OF THE INVENTION

Heating, ventilation, and air conditioning (HVAC) systems may employ a variety of components to achieve a desired conditioning capacity, for example, motors, engines, compressors, or the like. Generally, HVAC systems such as centrifugal chiller systems employ a centrifugal compressor for providing a cooling effect through vapor-compression of a working fluid. The centrifugal compressor may be powered through a turbine, diesel motor, gasoline motor, electric motor, or any other rotation means. It should be appreciated that in the event the rotation means fails, operation of the centrifugal chiller system ceases. For example, in an electrically-powered centrifugal chiller system, brown-outs or power glitches may shut down the chiller system in its entirety. Furthermore, in other electrically powered HVAC systems including motors, the brown-outs or power glitches may also cause system shutdown. Moreover, in some electrically-powered HVAC systems, start-up procedures are lengthy processes which may hinder operation of the system much longer than the duration of the actual power failure or brown out.

BRIEF DESCRIPTION OF THE INVENTION

According to an exemplary embodiment of the present invention, a method of motor operation includes monitoring a voltage of a power bus supplying power to the motor, determining if a power failure is occurring or has occurred based on the monitoring, and lowering an operational capacity of the motor in response to determining the power failure is occurring or has occurred.

According to another exemplary embodiment of the present invention, a system includes a system controller, a variable frequency drive (VFD) in communication with the system controller, and a motor in communication with the VFD. According to the exemplary embodiment, the VFD controller is configured to monitor a voltage of a power bus arranged therein to determine if a power failure has occurred or is occurring, and the VFD is configured to reduce a speed of the motor in response to determining the power failure is occurring or has occurred.

According to another exemplary embodiment of the present invention, an HVAC system includes an HVAC system controller, a variable frequency drive (VFD) in communication with the HVAC system controller, and a motor in communication with the VFD. According to the exemplary embodiment, the HVAC system controller is configured to monitor a voltage of a power bus arranged within the VFD to determine if a power failure has occurred or is occurring, and the VFD is configured to reduce a speed of the motor in response to the determining by the HVAC system controller.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

As disclosed herein, exemplary embodiments of the present invention provide an HVAC system and method of operating the same, which reduces the down-time of the system in the event or a full or partial power failure through a novel "ride-through" methodology. The technical benefits of exemplary embodiments include a reduction in the frequency of full start-up sequences being necessary upon restoration of power subsequent to a full or partial power failure.

Figure 1:
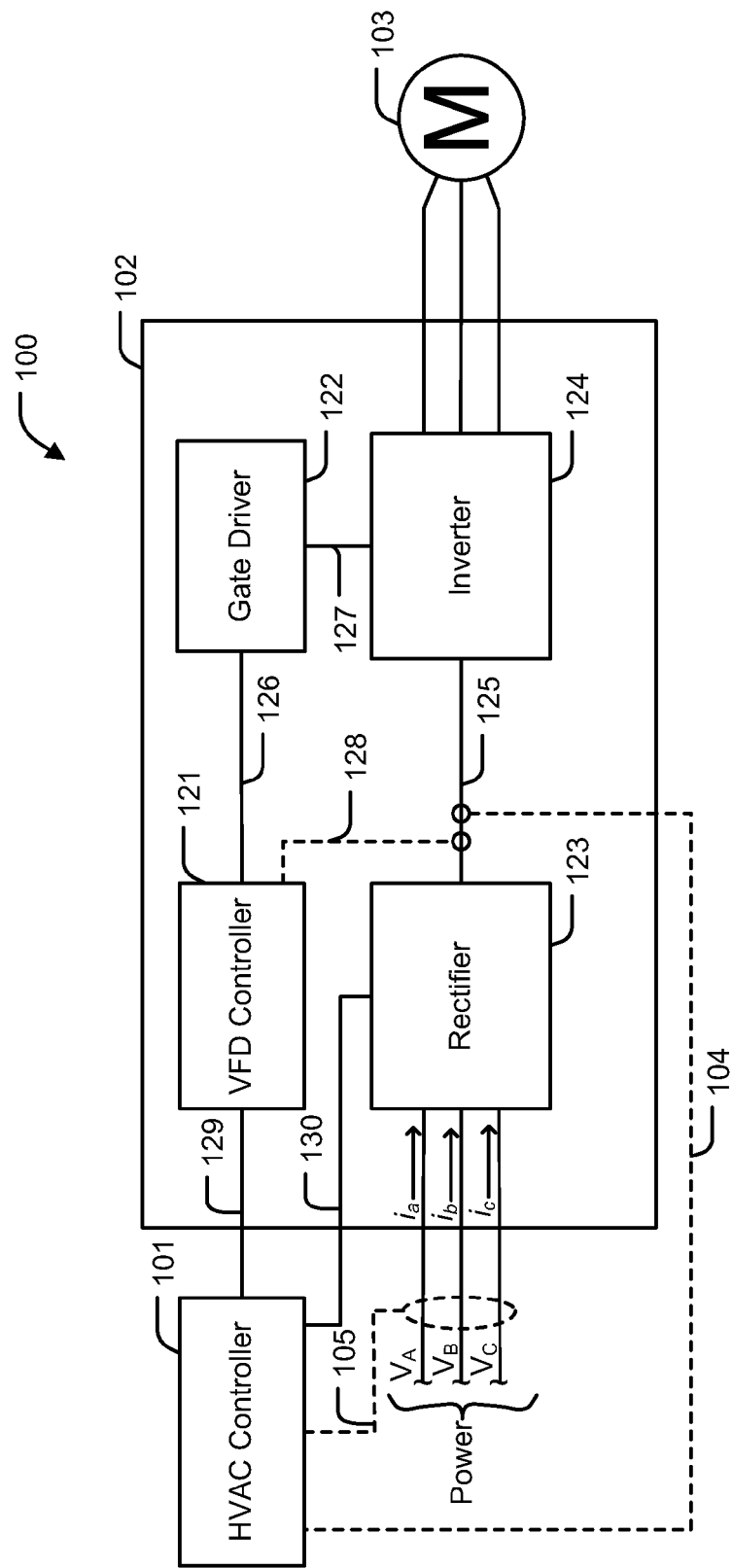
FIG. 1 depicts an HVAC system, according to an exemplary embodiment of the present invention.

Turning to FIG. 1, an HVAC system is illustrated. The system 100 includes an HVAC controller 101. The HVAC controller 101 may be any suitable controller including a programmable logic processing device configured to control operations of the system 100. For example, the HVAC controller 101 may be configured to perform a method of HVAC motor control as described herein.

The system 100 further includes variable frequency drive (VFD) 102 in communication with the HVAC controller 101. The VFD 102 may be any suitable VFD configured to process line power (e.g., single or poly-phase power) and output a variable frequency single or poly-phase power output. The VFD 102 may include a VFD controller 121 in signal communication with the HVAC controller 101 over communication medium 129. The VFD controller 121 may be any suitable controller configured to control rectification and inversion of power being processed by the VFD 102. The VFD 102 may further include gate driver 122 in signal communication with the VFD controller 121 over communication medium 126. The gate driver 122 may receive gate control signals from the VFD controller 121, and may process these signals to vary the frequency of power inversion by inverter 124 over communication medium 127. The VFD 102 further includes rectifier 123 in signal communication with the HVAC controller 101 over communication medium 130. The HVAC controller 101 may provide speed reference and/or demand control signals to the VFD controller and/or rectifier 123 to enable active rectification and load control over the VFD 102. As illustrated, the VFD 102 includes DC power bus 125 in communication with the rectifier 123 and inverter 124. The DC power bus may be monitored by one or both of the VFD controller 121 and HVAC controller 101 over lines 128 and 104, respectively. Thus, either one of the VFD controller 121 and HVAC controller 101 may sense voltage disruptions on the DC power bus 125 indicative of a full or partial power failure. Furthermore, the HVAC controller 101 may optionally monitor actual line power input to VFD 102 over communication medium 105. Therefore, the HVAC controller 101 may sense voltage disruptions of input power indicative of possible, imminent, or actual power failures. This may benefit some exemplary embodiments in early detection methodologies to further enhance the technical benefits of the present invention.

The system 100 further includes motor 103 in communication with the VFD 102. The motor 103 may be arranged to rotate an HVAC component, compressor, or other suitable component rotatable by a motor (not illustrated for clarity). It should be understood that although exemplary embodiments may be described as being applicable to HVAC systems, the same may be varied in many ways. For example, the methodologies of HVAC control described herein may be applicable to any system employing a DC bus to power a motor.

Figure 2:
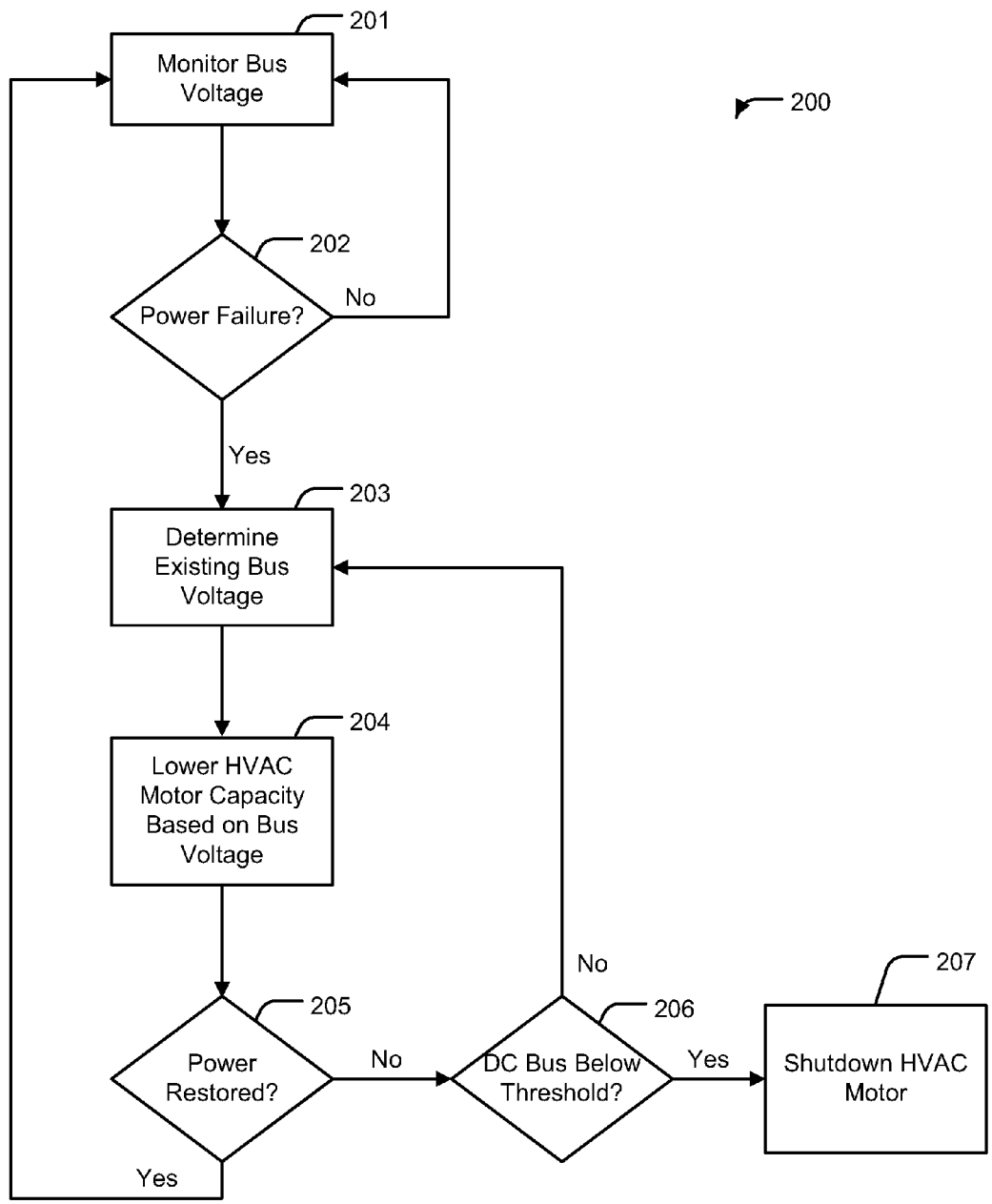
FIG. 2 depicts a method of HVAC motor control, according to an exemplary embodiment.

Hereinafter, a more detailed description of HVAC motor operation according to exemplary embodiments is described with reference to FIG. 2. According to FIG. 2, a method of HVAC control 200 includes monitoring a DC bus voltage of VFD 102 at block 201. For example, in the event of a full or partial power failure, one or both of the HVAC controller 101 and the VFD controller 121 may determine if a power failure has occurred at block 202. It is noted that the HVAC controller 101 and/or VFD controller 121 may also monitor input power to determine if a power failure has occurred. In the event of a power failure, the method 200 includes determining an existing bus voltage at block 203. Upon determining, the method 200 includes lowering the HVAC system 100's capacity (e.g., speed of motor powering an HVAC component such as a compressor) based on the bus voltage at block 204.

For example, during a power failure, the VFD 102 may still have sufficient voltage to power the motor 103. Depending upon the existing voltage on the DC bus 125, the HVAC controller 101 may direct the VFD controller to lower the speed of the motor 103 through the inverter 124, for example, by reducing a frequency of the power output to the motor 103. The speed of the motor 103, and thus the operational capacity of the HVAC system 100, may be reduced according to predetermined or desirable ranges based upon existing DC bus voltage. Such ranges may be adjustable in the field or preconfigured based upon empirical or experimental data on reduced HVAC motor operation power drainage.

Upon lowering of the HVAC system 100's capacity, the method 200 includes determining if power has been restored at block 205. If power has been restored, the operational capacity of the HVAC system 100 is increased and bus voltage is monitored for power failures again at blocks 201-202.

It is noted that the operational capacity of the HVAC system 100 may be increased to a standard steady-state operational capacity. Alternatively, the operational capacity of the HVAC system may be increased to a reduced or slightly reduced capacity under maintenance or inspection of the HVAC system is possible.

Turning back to FIG. 2, if power has not been restored, the method 200 includes determining if the voltage of DC bus 125 is below a predetermined or desired threshold at block 206. The predetermined or desired threshold may be a voltage at which motor operation is not possible, or at which operation of the motor may cause damage to the HVAC system 100's componentry. If the DC bus voltage is below the threshold, the method 200 includes shutting down the HVAC system and motor at block 207. However, if the voltage is not below the threshold, the method 200 includes continually iterating through gradual, continual, or regular reductions in HVAC system capacity (e.g., blocks 203-206) until either power has been restored or the DC bus voltage falls below the threshold noted above. Alternatively, the operational capacity of the HVAC system may be maintained in the initial or subsequent reduced capacity values until power is restored or the DC bus voltage falls below the threshold. In this manner, HVAC system operation may perform a "ride-through" of a full or partial power failure thereby reducing the frequency of long start-up sequences in the event power is restored before the DC bus voltage falls below the threshold.

As described above, exemplary embodiments of the present invention provide HVAC systems and methods of operating the same which overcome the drawbacks of conventional systems. The HVAC systems described herein may be centrifugal chiller systems or any other suitable HVAC or motor systems including DC buses which may provide residual power during a full or partial power outage at which a "ride-through" of motor operation may be performed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of motor operation, comprising:
monitoring a voltage of a power bus supplying power to the motor;
determining if a power failure is occurring or has occurred based on the monitoring;
determining an existing voltage of the power bus in response to the determining if the power failure is occurring or has occurred based on the monitoring; and
lowering an operational capacity of the motor to a lowered operational capacity in response to the determining the existing voltage, wherein the lowered operational capacity of the motor is based upon the existing voltage.

2. The method of claim 1, wherein the lowered operational capacity of the motor is based upon predetermined discharge rates of the motor under a power failure.

3. The method of claim 1, further comprising determining if power has been restored, and, if power is restored, increasing the operational capacity of the motor.

4. The method of claim 3, wherein increasing the operational capacity of the motor includes increasing the operational capacity of the motor to one of a standard steady-state operational capacity or a reduced steady-state operational capacity.

5. The method of claim 1, further comprising determining if the existing voltage of the power bus is below a predetermined threshold, and, if the existing voltage of the power bus is below the predetermined threshold, shutting down the motor.

6. The method of claim 1, further comprising determining if the existing voltage of the power bus is below a predetermined threshold, and, if the existing voltage of the power bus is not below the predetermined threshold, continually reducing the operational capacity of the motor at regular intervals until the existing voltage of the power bus is below the predetermined threshold.

7. The method of claim 1, further comprising determining if the existing voltage of the power bus is below a predetermined threshold, and, if the existing voltage of the power bus is not below the predetermined threshold, maintaining the reduced operational capacity of the motor until the existing voltage of the power bus is below the predetermined threshold.

8. The method of claim 1, wherein determining if a power failure is occurring or has occurred includes determining if the voltage of the power bus has decreased below a nominal powered level.

9. The method of claim 1, wherein the motor is a component of a HVAC system.

10. A system, comprising:
a system controller;
a variable frequency drive (VFD) in communication with the system controller; and
a motor in communication with the VFD;
wherein the VFD is configured to monitor a voltage of a power bus arranged therein to determine if a power failure has occurred or is occurring, and wherein the VFD is configured to reduce a speed of the motor in response to the determining, wherein the reduced speed of the motor is based upon the voltage of the power bus.

11. The system of claim 10, wherein the VFD is further configured to determine if power to the system has been restored, and, if power is restored, the VFD is configured to increase the speed of the motor.

12. The system of claim 10, wherein the VFD is further configured to determine if the voltage of the power bus is below a predetermined threshold, and, if the voltage of the power bus is below the predetermined threshold, the VFD is configured to direct the system controller to shut down the motor or system.

13. The system of claim 10 wherein the VFD is further configured to determine if the voltage of the power bus is below a predetermined threshold, and, if the voltage of the power bus is not below the predetermined threshold, the VFD is configured to continually reduce the speed of the motor until the voltage of the power bus is below the predetermined threshold.

14. A heating, ventilation, and air conditioning (HVAC) system, comprising:
an HVAC system controller;
a variable frequency drive (VFD) in communication with the HVAC system controller; and
a motor in communication with the VFD;
wherein the HVAC system controller is configured to monitor a voltage of a power bus arranged within the VFD to determine if a power failure has occurred or is occurring, and wherein the VFD is configured to reduce a speed of the motor in response to the determining by the HVAC controller, wherein the reduced speed of the motor is based upon the voltage of the power bus.

15. The system of claim 14, wherein the HVAC system controller is further configured to determine if power to the HVAC system has been restored, and, if power is restored, the HVAC system controller is configured to direct the VFD to increase the speed of the motor.

16. The system of claim 14, wherein the HVAC system controller is further configured to determine if the voltage of the power bus is below a predetermined threshold, and, if the voltage of the power bus is below the predetermined threshold, the HVAC system controller is configured shut down the HVAC system.

17. The system of claim 14, wherein the HVAC system controller is further configured to determine if the voltage of the power bus is below a predetermined threshold, and, if the voltage of the power bus is not below the predetermined threshold, the HVAC system controller is configured to direct the VFD to continually reduce the speed of the motor until the voltage of the power bus is below the predetermined threshold.

* * * * *